May 19, 1942.   A. H. STEWART   2,283,705
MANUFACTURE OF TILE
Original Filed Oct. 6, 1936
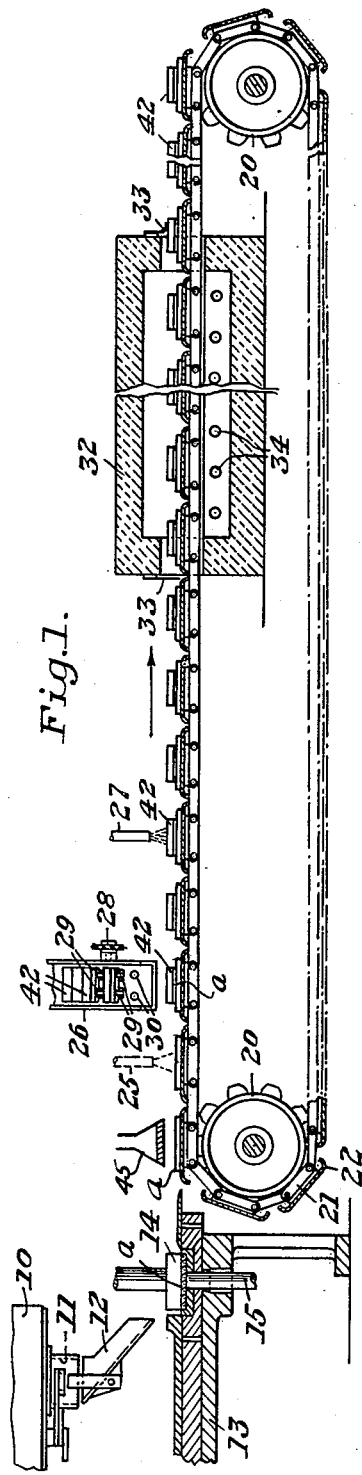
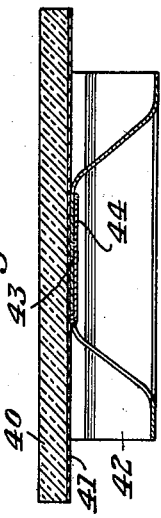
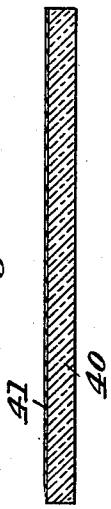
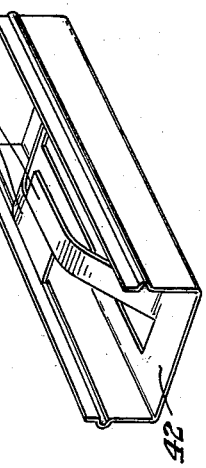
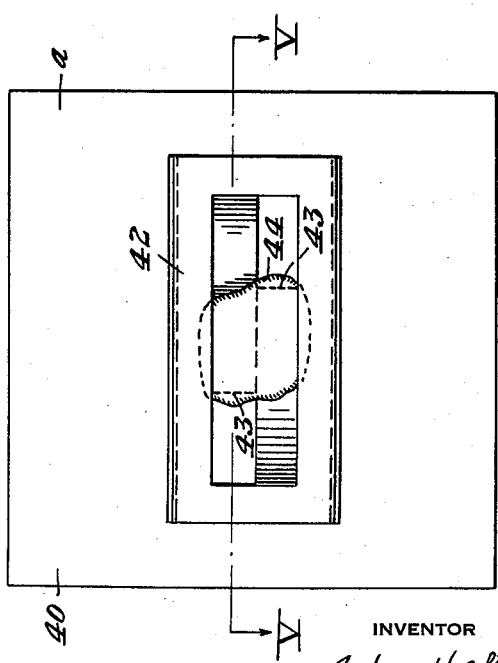
INVENTOR
Andrew H. Stewart
By Thomas G. Miller
His attorney Patented May 19, 1942

2,283,705

UNITED STATES PATENT OFFICE 2,283,705

MANUFACTURE OF TILE

Andrew H. Stewart, Shields, Pa.

Original application October 6, 1936, Serial No. 104,186, now Patent No. 2,145,103, dated January 24, 1939. Divided and this application May 16, 1938, Serial No. 208,116

9 Claims. (Cl. 49—81)

This invention relates to an improved method of manufacturing and/or assembling a tile and a mount structure therefor, and particularly to an improved method of securing a mount element to a tile structure.

This application is a division of my copending application Serial Number 104,186, filed October 6, 1936, entitled, "Tile structure and method of making," Patent No. 2,145,103, dated January 24, 1939. As pointed out therein, it has been customary to use cementitious or plastic materials or metal clips in connection with plastic materials for mounting tile on a building construction. However, such a mounting does not permit the desired independent expansion and contraction of the tile without sacrificing security of the mounting. And, previous to the present invention, no one has been able to physically secure mount elements having characteristics or molecular structure unlike that of the tile upon which they are to be attached or mounted. The applicant has particular reference to the securing of a suitable mount element to the back face of a tile in such a manner as to permit sufficient freedom of expansion and contraction of the tile independently of the mounting structure without excessive cost. Tile projections imbedded in cementitious material hold the tile rigidly in position.

In view of the above and other considerations, it has been an object of my invention to provide a successful method for physically securing mount elements such as those of metal construction to tile of ceramic, vitreous, or other suitable materials at a very low cost.

Another object has been to provide a practical and/or efficient procedure for the manufacture of tile, and particularly for the manufacture of tile having characteristics of expansion and contraction when mounted.

A further object has been to devise an improved procedure for attaching a mount element to a tile or similar structure and/or to a procedure for conditioning the tile.

These and many other objects of my invention will appear to those skilled in the art from the description thereof, the claims, and the accompanying drawing, in which:

Figure 1 is a longitudinal side elevation showing somewhat diagrammatically a preferred manufacturing layout for producing tile structure in accordance with my invention;

Figure 2 is a sectional view in elevation through a tile having a layer of suitable material applied in accordance with my invention;

Figure 3 is a perspective view in elevation of a mount element separately fabricated in accordance with my invention; the element is to be physically secured to a back face of a tile;

Figure 4 is a back plan view of a tile structure such as shown in Figure 2 with a mount element such as Figure 3 thereon; and Figure 5 is a sectional view in elevation along the line V—V of Figure 4.

Although it will be apparent to those skilled in the art that any suitable mount structure may be applied in accordance with the principles of my invention, for the purpose of illustration, I have particularly shown a specified form of structure 42 of channel form adapted to be utilized in a manner such as previously explained in my copending application. The mount element 42 is provided with downwardly projecting punched out or pressed out strap-like mount leg and base portions 43 that are adapted to rest upon a back face of tile 40, such as shown in Figure 2. The tile 40 of ceramic, vitreous, or other suitable material, is preferably coated with a molecularly adherent or physically secured metal coating 41 under conditions which will be hereinafter more particularly described. The mount element is then preferably attached to the face 41 of the tile 40 by an area of metal 44, see particularly Figure 4, that, as shown, overlaps the base or feet portions of the straps 43 and abuts the facing 41. It will thus be apparent that the leg members 43 are free to expand and contract and to thus flexibly hold the tile 40 in position with respect to a suitable mount structure of a building construction.

In accordance with a preferred procedure, see Figure 1, where a vitreous material such as glass is used, I have provided a forehearth 10, a feed orifice 11, and a feed trough 12. The molten material is then directed to one or a plurality of mold openings in a mold table 13. The mold table is shown provided with a reciprocating presser plunger 14 and a reciprocating knockout 15. A continuous conveyor having suitable sprocket wheels 20, pivotally connected links 21, and spaced-apart table-like or tile-receiving portions 22, is adapted to successively receive or take up preformed tile a and to carry them successively to a number of treating positions. I have shown a metal spray station 25 for applying molten metal in globular form under pressure to a back face of a tile a, a mount element feed station 26, and a mount element bonding station 27. The spray device of station 27 may be similar to that of station 25, but the former will preferably have a more limited area of application.

At station 25, I preferably cover the entire back surface of the tile 40 with the molten metal 41, see Figure 2. At position 26, I preferably successively discharge the mount elements 42 employing a suitable trip mechanism such as 28 having trip fingers 29 which segregates each element and feeds it in such a manner that each tile successively presented is provided with a suitably-positioned mount element 42. Gas nozzles 30 or other suitable heat producing means are provided at 26 for preheating the mount elements 42. An annealing furnace 32 anneals the tile 40 with the mount element 42 attached thereto. Asbestos curtains 33 are provided at the entrance and adjacent the carrier openings of the furnace for conserving the heat provided by any suitable means such as gas nozzles 34.

In accordance with my preferred procedure, the molten glass or other material is fed to the press 13 where it is formed or shaped into any suitable form, preferably with a substantially planar back face. The temperature of the forming operation is at and preferably above the deformation temperature of the glass or other material and this temperature may vary, depending upon the type of glass or other material used. The range may be between 1200° and 3000° F. If flat glass is used and preheated, the glass having first been cut to a tile form, it may only be heated from 500° F. up to its deformation temperature; this temperature depends on the type of glass used. Thus, preformed tile may be used if it is preheated sufficiently to cause adherence of the metal spray and then subsequently annealed. Each tile, after being thus formed, is successively fed to the continuous conveyor that is continuously moving and that carries each tile past the above-mentioned stations and finally through the annealing furnace 32. As shown particularly in Figure 1, the tile a may be preheated by some suitable means such as a gas jet or nozzle 45. The need for preheating will be determined particularly from considerations of the time involved between the hot forming operation of the tile and the bonding operation between the tile and its mount element.

The mount elements such as 42 are preferably prefabricated in a suitable metal working machine and successively fed from the chute 26 to a position substantially centrally of each tile a. The mount elements are preferably preheated to substantially the temperature of the tile before they are positioned upon the tile. Any suitable form of heating means such as the gas jets 30 or electrical heat may be utilized in this connection. Hot fastening or bonding metal is velocity-sprayed or impacted upon the feet portions 43 in the spacing between the adjacent feet and upon adjacent portions of the back face of the tile through the opening in the back of the mount element made by pushing or pressing out the straps.

In providing a bond, I preferably melt the metal or alloy with a flame that is neutral, and spray the molten metal upon the surface of the glass article while the article is still hot from the shaping operation (800–1200° F.). An effective physical adherence is obtained between the glass and the sprayed metal; the strap portions are bridged over by the sprayed metal and held securely in place. The strap portions, of course, can be punched out in corrugated form to more securely fasten in position. If a transparent or translucent tile is employed, I contemplate spraying its back face with a suitable reflecting metal such as aluminum at station 25 before welding or bonding a mount element thereto; this operation is also accomplished while the article is still hot (800–1200° F.) from the shaping operation. It is thus apparent that station 25 can be omitted and the mount element 42 directly attached to the back face of the tile by means at the station 29. However, as previously explained, I prefer to provide a backing layer of suitable material such as 41 of Figure 2.

Since the glass tile is still hot from the forming operation within the range above-mentioned, the sprayed metal physically adheres thereto and securely and rigidly attaches the straps or feet portions 43 to the back face of the tile. Each successive tile and its attached mount element are then continuously carried to the annealing furnace where the glass is annealed; as the annealing temperature of the glass is lower than the softening or melting point of the mounting, the latter maintains its original shape and its strap portions still retain their resiliency.

If desired, each thus-formed unit may be then dipped in paraffin, asphaltum, or other cushioning medium to which cementitious material will not adhere. Such material will prevent any part of the tile itself from attaching to the cement or plaster wall and will prevent the strap portions 43 from becoming rigidly imbedded in any backing material.

In the spraying operation, any suitable metal having desired characteristics under the conditions set forth may be employed. I have successfully utilized aluminum, aluminum bronze, nickel, steel, zinc, tin, copper, various alloys, etc.; I have, however, found that aluminum provides a better reflecting surface than most metals.

I have also applied molten metal in a volatilized or vapor state; a vacuum is preferably employed in such a case. However, I prefer the metal spray method such as heretofore explained. I have also discovered that the mount elements should be reheated to a temperature conducive to a bonding of the material thereof with the sprayed metal and then in turn to the glass tile. For elements of a flexible material such as spring metal, I keep the temperature down as low as possible. In other words, the temperature is preferably kept below 1200° F., and if raised above this point, I contemplate reconditioning the metal material.

Although for the purpose of illustrating my invention, I have shown a preferred method of carrying out my novel procedure, it will be apparent to those skilled in the art that many modifications, substitutions, additions, arrangements, and/or combinations thereof may be made without departing from the spirit and scope of the invention as indicated in the appended claims.

I claim:

1. In a method of manufacturing a tile of ceramic or vitreous material and of attaching a mount element of a material that will not normally physically adhere with the material of which the tile is formed, the steps of forming a tile shape from molten or viscous material, providing a suitable mount element having extending attachment portions, and while the shape is still hot from the forming operation, placing the attachment portions of said mount element in abutment with the shaped tile, and spraying molten metal upon the attaching portions of the mount element and upon an adjacent portion of the tile to a depth sufficient to secure the mount element to the tile, and annealing the tile.

2. In a method of manufacturing tile of vitreous or other suitable material and of attaching a metal mount element thereto, the steps of forming a tile from molten material, preheating a metal mount element and placing it in abutment with the tile, and spraying molten metal upon adjacent portions of the tile and the mount element to form a physical bond therebetween while the tile is still hot from the shaping operation and the element is still hot from the preheating operation.

3. In a method of manufacturing tile and of attaching mount elements thereto, the steps of continuously moving a series of tile members while successively subjecting the tile members to a metal pressure spray application, positioning a mount element on the sprayed-metal portion of each tile member and metal bonding the thus-positioned mount elements to the tile members by a metal pressure spray application thereto.

4. In a method as defined in claim 3, the step of preheating the mount elements to a metal bonding temperature before spray-metal bonding them to the tile members.

5. In a method of manufacturing tile of vitreous or other suitable material and of attaching a metal mount element thereto, the steps of forming the tile from molten material, providing a metal mount element and heating it to a temperature of not more than 1200° F., positioning the thus-heated mount element on the tile while the latter is still hot from the forming operation, and metal-bonding the mount element to the tile while the mount element is still hot from the heating operation.

6. In a method as defined in claim 5, wherein the metal bonding is accomplished by a molten spray metal application.

7. In a method of manufacturing tile and of attaching a mount element thereto, the steps of moving a series of tile members with their back surface portions facing upwardly in a substantially horizontal plane while successively positioning mount elements upon the back planar surface of each of the tile members, providing the tile and mount element with a hot-bonding temperature of not greater than substantially 1200° F., and applying hot molten metal under pressure to adjacent portions of the tile and the mount element from the top planar side of the tile to metal-bond the mount element to the tile.

8. In a method of manufacturing tile and of attaching a mount element thereto, the steps of moving a series of tile members with their back surface portions facing upwardly in a substantially horizontal plane while successively positioning mount elements upon the back planar surface of each of the tile members, heating each tile and mount element to a hot-bonding temperature, and while the tile and mount element are still hot applying hot molten metal under pressure to adjacent portions of the tile and the mount element from the top planar side of the tile to metal-bond the mount element to the tile, and thereafter annealing each tile-mount element combination.

9. In a method as defined in claim 3, the step of heating the tile members to a metal-bonding temperature before successively subjecting them to the metal pressure spray application.

ANDREW H. STEWART.